United States Patent [19]
Stevens

[11] Patent Number: 6,059,496
[45] Date of Patent: May 9, 2000

[54] ALL-TERRAIN VEHICLE SAFETY RACK SYSTEM

[76] Inventor: Alan E. Stevens, Rte. 1, Box 968, Doniphan, Mo. 63935

[21] Appl. No.: 09/120,477

[22] Filed: Jul. 23, 1998

[51] Int. Cl.[7] .................................................. B60P 7/08
[52] U.S. Cl. ..................................... 410/7; 410/3; 410/19
[58] Field of Search ............................. 410/2, 3, 4, 7, 410/9, 19; 296/3; 211/13.1, 132.1; 224/403, 404, 550, 551, 552

[56] References Cited

U.S. PATENT DOCUMENTS

| | | | |
|---|---|---|---|
| 3,891,262 | 6/1975 | Brunel | 296/3 |
| 3,912,139 | 10/1975 | Bowman | 410/3 |
| 5,190,337 | 3/1993 | McDaniel | 296/3 |
| 5,439,152 | 8/1995 | Campbell | 296/3 X |
| 5,816,757 | 10/1998 | Huston | 410/3 |
| 5,833,412 | 11/1998 | Valencia et al. | 410/2 |
| 5,941,565 | 8/1999 | Clendenin, Jr. | 280/759 |

*Primary Examiner*—Stephen T. Gordon

[57] ABSTRACT

An all-terrain vehicle safety rack system including a base frame having two parallel rails with two parallel spacer bars coupled therebetween to maintain the rails at a fixed predetermined distance.

4 Claims, 2 Drawing Sheets

ALL-TERRAIN VEHICLE SAFETY RACK SYSTEM

BACKGROUND OF THE INVENTION

1. Field of the Invention

The present invention relates to an all-terrain vehicle safety rack system and more particularly pertains to safely and conveniently positioning an all-terrain vehicle in truck beds, trailer beds and the like.

2. Description of the Prior Art

The use of rack systems for securing objects in vehicles of known designs and configurations is known in the prior art. More specifically, rack systems for securing objects in vehicles of known designs and configurations heretofore devised and utilized for the purpose of conveniently and safely positioning objects on truck beds, trailer beds and the like through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,553,762 to Brown discloses a Vehicle Carrier and Ramp Assembly. U.S. Pat. No. 4,592,564 to Warnock et al. discloses an ATV/ATC Tow Bar. U.S. Pat. No. 5,593,191 to Alexander discloses a Vehicle Attachment for Transporting Snowmobiles. European Patent Application 277,896 discloses a Swiveling Element Supporting a Vehicle By Its Wheels. International Application Number PCT/FI90/00316 to Moisio discloses a Platform or Bed for Transporting Forest Harvesters. U.S. Pat. No. 3,430,983 to Jones discloses a Trailer Hitch for Motorcycles. Lastly, U.S. Pat. No. 2,789,832 to Zumwalt discloses a Combined Motorcycle Tow Bar Coupling and Front Wheel Lift.

While these devices fulfill their respective, particular objectives and requirements, the aforementioned patents do not describe all-terrain vehicle safety rack systems as disclosed herein.

In this respect, the all-terrain vehicle safety rack system according to the present invention substantially departs from the conventional concepts and designs of the prior art, arid in doing so provides an apparatus primarily developed for the purpose of safely and conveniently positioning all-terrain vehicles in truck beds, trailer beds and the like.

Therefore, it can be appreciated that there exists a continuing need for a new and improved all-terrain vehicle safety rack system which can be used for safely and conveniently positioning all-terrain vehicles in truck beds, trailer beds and the like. In this regard, the present invention substantially fulfills this need.

SUMMARY OF THE INVENTION

In view of the foregoing disadvantages inherent in the known types of rack systems for securing objects in vehicles of known designs and configurations present in the prior art, the present invention provides an improved all-terrain vehicle safety rack system. As such, the general purpose of the present invention, which will be described subsequently in greater detail, is to provide a new and improved all-terrain vehicle safety rack system and method which has all the advantages of the prior art and none of the disadvantages.

To attain this, the present invention essentially comprises an all-terrain vehicle safety rack system that is comprised of a plurality of components including a base frame. The base frame has two parallel L-shaped rails that are positionable on a bed from front to back with two parallel spacer bars transverse to the L-shaped members coupled therebetween to maintain the rails at a fixed predetermined distance. Also provided are securement members including two rectangular blocks which are adapted to be secured to the front portion of the bed and to receive the rails therebeneath and channel irons with recesses which extend outwardly from each rail adjacent to the rear portion of the bed. Each recess has an associated securement block positionable within a recess with a plurality of apertures through each block and an associated aperture through each channel iron with an adjustment pen to allow for adjustment as a function of the width of the bed. Additionally provided is a front cross bar fixedly positioned forwardly above the axis of the front wheels of the supported vehicle and a pair of fixed support braces extending between the front cross bar and rails. Lastly provided is a rear support rail which is adjustably positioned rearwardly and above the axis of the rear tires with struts pivotally secured at their lower ends to an intermediate portion of the rails and a cylindrical sleeve which is slidably received upon the upper extents of each strut. The rear support rail is secured at its ends to the sleeves. The upper extents of the struts have threads and a threaded tightening nut on each strut for securing the sleeves and rear support rail in a position for securing the all terrain vehicle to the bed and a tightening lever received on each nut for positioning purposes of the threaded rod for adjusting the position of the cylindrical support and rear tire support.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved all-terrain vehicle safety rack system which has all of the advantages of the prior art rack systems for securing objects in vehicles of known designs and configurations and none of the disadvantages.

It is another object of the present invention to provide a new and improved all-terrain vehicle safety rack system which may be easily and efficiently manufactured and marketed.

It is further object of the present invention to provide a new and improved all-terrain vehicle safety rack system which is of durable and reliable constructions.

An even further object of the present invention is to provide a new and improved all-terrain vehicle safety rack system which is susceptible of a low cost of manufacture with regard to both materials and labor, and which accordingly is then susceptible of low prices of sale to the consuming public, thereby making such all-terrain vehicle safety rack system economically available to the buying public.

Even still another object of the present invention is to provide an all-terrain vehicle safety rack system for safely and conveniently positioning all-terrain vehicles in truck beds, trailer beds and the like.

Lastly, it is an object of the present invention to provide a new and improved all-terrain vehicle safety rack system including a base frame having two parallel rails with two parallel spacer bars coupled therebetween to maintain the rails at a fixed predetermined distance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
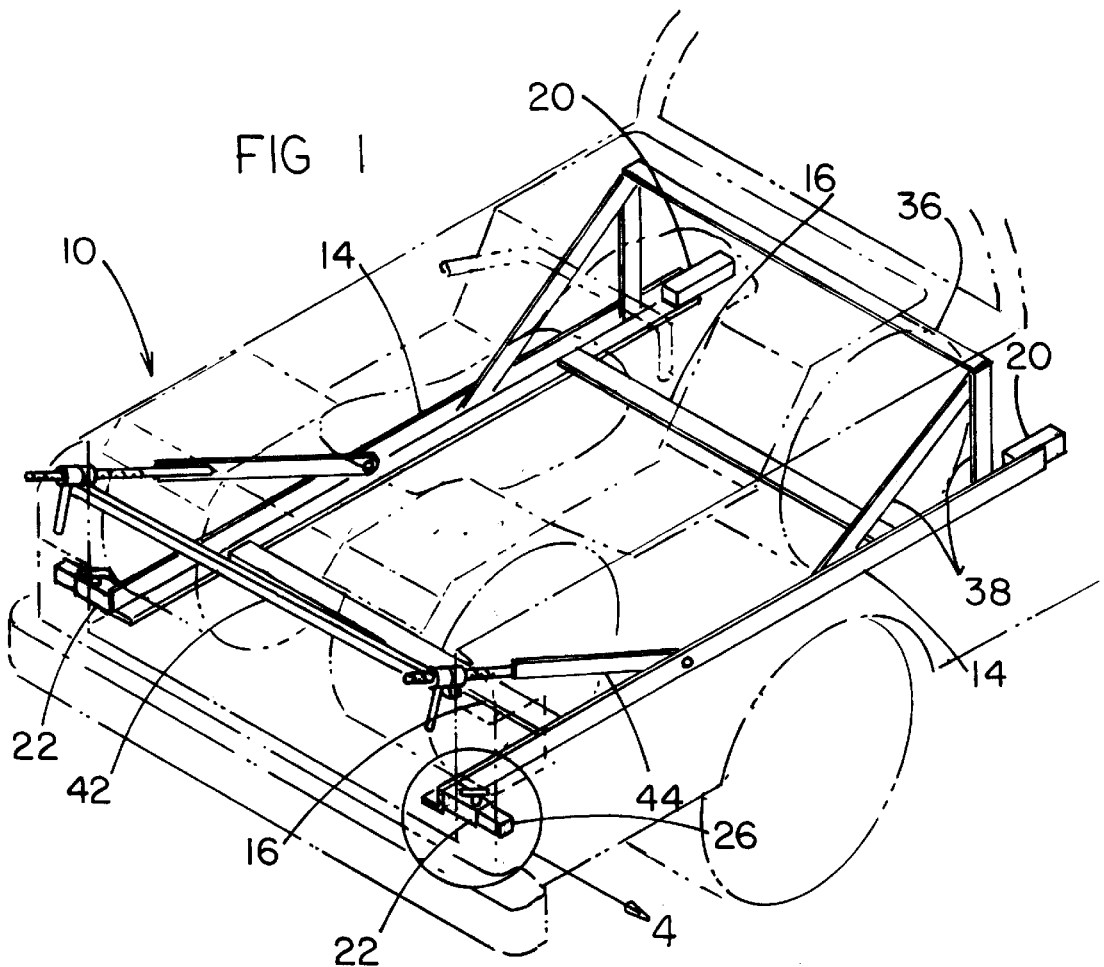
FIG. 1 is a perspective view of the preferred embodiment of the all-terrain vehicle safety rack system constructed in accordance with the principles of the present invention.
Figure 2:
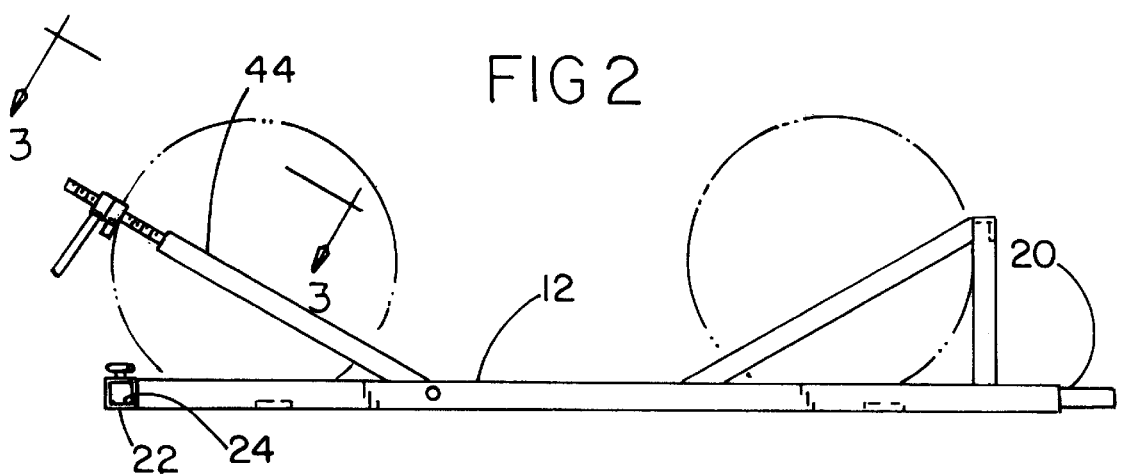
FIG. 2 is a side elevational view of the apparatus shown in FIG. 1 but with the truck removed.
Figure 3:
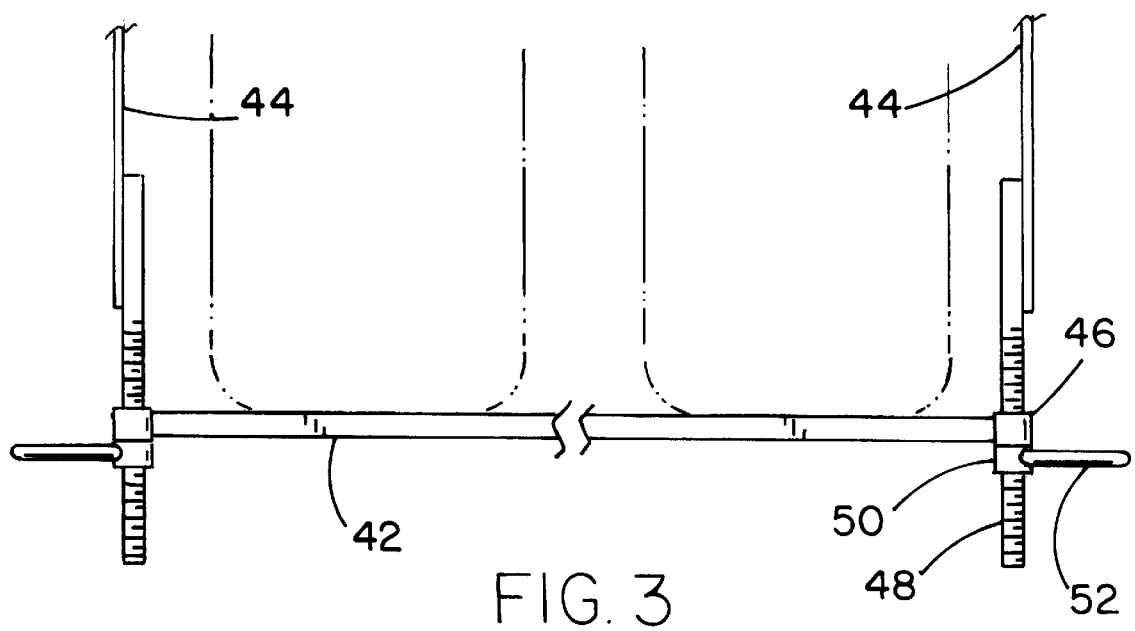
FIG. 3 is a cross-sectional view taken along line 3—3 of FIG. 2.
Figure 4:
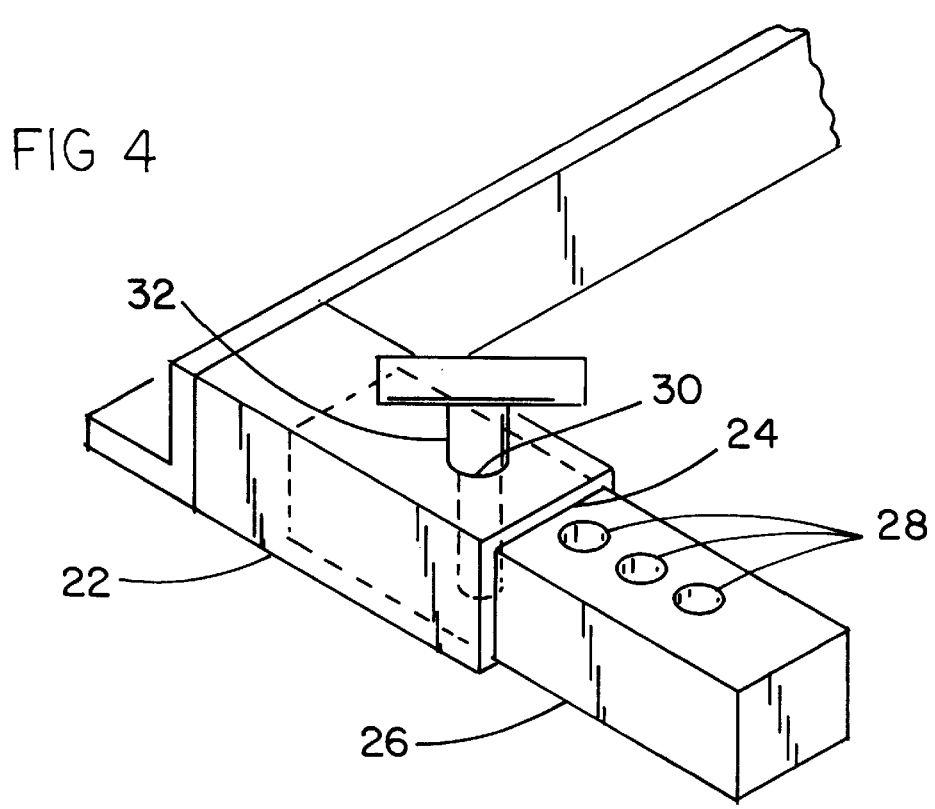
FIG. 4 is a cross-sectional view taken at circle 4—4 of FIG. 1.

With reference now to the drawings, and in particular to FIG. 1 thereof, the preferred embodiment of the new and improved all-terrain vehicle safety rack system embodying the principles and concepts of the present invention and generally designated by the reference numeral 10 will be described.

The present invention, the all-terrain vehicle safety rack system 10 is comprised of a plurality of components. Such components in their broadest context include a frame, securement members, a front cross bar and a rear support rail. Such components are individually configured and correlated with respect to each other so as to attain the desired objective.

The new and improved all-terrain vehicle safety rack system 10 includes a base frame 12. The base frame has two parallel L-shaped rails 14. The L-shaped rails are positionable on a bed from front to back with two parallel spacer bars 16 transverse to the L-shaped members coupled therebetween to maintain the rails at a fixed predetermined distance.

Also provided are securement members including two rectangular blocks 20 which are adapted to be secured to the front portion of the bed and to receive the rails therebeneath and channel irons 22 with recesses 24 which extend outwardly from each rail adjacent to the rear portion of the bed. Each recess has an associated securement block 26 positionable within a recess with a plurality of apertures 28 through each block and an associated aperture 30 through each channel iron with an adjustment pin 32 to allow for adjustment as a function of the width of the bed.

Additionally provided is a front cross bar 36 fixedly positioned forwardly above the axis of the front wheels of the supported vehicle and a pair of fixed support braces 38 extending between the front cross bar and rails.

Lastly provided is a rear support rail 42 which is adjustably positioned rearwardly and above the axis of the rear tires with struts 44 pivotally secured at their lower ends to an intermediate portion of the rails and a cylindrical sleeve 46 slidably received upon the upper extents of each strut. The rear support rail is secured at its ends to the sleeves. The upper extents of the struts have threads 48 and a threaded tightening nut 50 on each strut for securing the sleeves and rear support rail in a position for securing the all terrain vehicle to the bed and a tightening The all-terrain safety rack system as described herein is an accessory product used to safely and easily transport all-terrain vehicles in a truck bed or on a trailer. The safety rack is installed onto the bed of a truck with adjustable length side retainers which are adjustable depending on the width of the truck bed or trailer. On a trailer, bolt holes in the mainframe allow the use to bolt the rack directly to the platform of the trailer. The all-terrain vehicle is driven up the ramps and seated on the racks. The wheel stop in front of the rack prevents the drive from going too far and hitting the front of the truck bed while loading. Once the all-terrain vehicle is loaded onto the trailer, the cross retainer bar is lifted I place behind the rear wheels. A large wing nut is used to adjust the bar and secure the all-terrain vehicle.

The system consists of components parts manufactured from angle iron, bolts, flat stock and square tubing. The components are welded together to form the safety rack. When not in use the rack can be adjusted to take up a smaller space when storing.

The present system protects both the truck and the all-terrain vehicle from damage caused by sudden movement of the transporting vehicle. The present system is stronger and more reliable than straps which are currently used for transporting all-terrain vehicles. The present system allows for quick and easy securing and unloading of the all-terrain vehicle. The present system also allows for the all-terrain vehicle to be secured in a truck when hauling with the tailgate down.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved all-terrain vehicle safety rack system positionable in truck and trailer beds comprising, in combination:

a base frame having two parallel L-shaped rails, positionable on a bed from front to back with two parallel spacer bars transverse to the L-shaped members coupled therebetween to maintain the rails at a fixed predetermined distance;

securement members including two rectangular blocks adapted to be secured to the front portion of the bed and adapted to receive the rails therebeneath and channel irons with recesses extending outwardly from each rail adjacent to the rear portion of the bed, each recess having an associated securement block positionable within said recess with a plurality of apertures through each securement block and an associated aperture through each channel iron with an adjustment pin to allow for adjustment as a function of the width of the bed;

a front cross bar fixedly positioned above the front portion of the bed and a pair of fixed support braces extending between the front cross bar and rails;

a rear support rail adjustably positioned above the back portion of the bed with struts pivotally secured at their lower ends to an intermediate portion of the L-shaped rails and a cylindrical sleeve slidably received upon the upper extents of each strut, the rear support rail being secured at its ends to the sleeves, the upper extents of the struts having threads with a threaded tightening nut on each strut for securing the sleeves and rear support rail in a position for securing the all terrain vehicle to the bed and a tightening lever received on each nut for adjusting the position of the cylindrical sleeve on the strut.

2. An all-terrain vehicle safety rack comprising:

a base frame having two parallel rails with two parallel spacer bars coupled therebetween to maintain the rails at a fixed predetermined distance; and securement means including two blocks adapted to be secured to the front portion of a bed and adapted to receive the rails for adjusting to the width of the bed therebeneath and channel irons extending outwardly from each rail adjacent to the rear of the bed, each with an aperture therethrough and a pair of securement blocks positionable within the channel irons with a plurality of apertures therethrough to allow for adjustment as a function of the width of the bed.

3. The apparatus as set forth in claim 2 and further comprising a rear support rail positionable rearward above the rear portion of the bed with struts pivotally secured at their lower ends to an intermediate portion of the L-shaped rails.

4. An all-terrain vehicle safety rack comprising:

a base frame having two parallel rails with two parallel spacer bars coupled therebetween to maintain the rails at a fixed predetermined distance;

securement means including two blocks adapted to be secured to the front portion of a bed and adapted to receive the rails for adjusting to the width of the bed therebeneath and channel irons extending outwardly from each rail adjacent to the rear of the bed, each with an aperture therethrough and a pair of securement blocks positionable within the channel irons with a plurality of apertures therethrough to allow for adjustment as a function of the width of the bed; and a slidable sleeve slidably received on upper extents of each of a pair of struts, a rear support rail being secured at its ends to the sleeves, the upper extents of the struts having threads with a threaded tightening nut on each strut for securing the sleeves and rear support rail in a position for securing the all terrain vehicle to the bed.

* * * * *